United States Patent [19]

Boyd

[11] Patent Number: 4,764,035
[45] Date of Patent: Aug. 16, 1988

[54] MOLDED SELF-LUBRICATING SPLIT-RING BEARING ASSEMBLY

[75] Inventor: Richard M. Boyd, St. Louis Park, Minn.

[73] Assignee: Quadion Corporation, Minneapolis, Minn.

[21] Appl. No.: 117,802

[22] Filed: Nov. 6, 1987

[51] Int. Cl.⁴ .............................................. F16C 17/02
[52] U.S. Cl. .................................... 384/152; 384/220; 384/273; 384/278; 384/297; 384/906; 384/909
[58] Field of Search ............... 384/152, 220, 273, 278, 384/301, 297, 909, 906

[56] References Cited

U.S. PATENT DOCUMENTS

| | | |
|---|---|---|
| Re. 24,332 | 6/1957 | Svenson . |
| 1,361,471 | 12/1920 | Kozub ................................. 384/273 |
| 2,873,132 | 2/1959 | Tanner . |
| 2,954,264 | 9/1960 | Tisch et al. . |
| 2,968,501 | 1/1961 | Tisch . |
| 2,983,533 | 5/1961 | Tisch . |
| 3,076,683 | 2/1963 | Hanley ................................ 384/152 |
| 3,300,225 | 1/1967 | Shepler . |
| 3,322,433 | 5/1967 | Rentschler . |
| 3,418,001 | 12/1968 | Rentschler et al. ................. 277/165 |
| 3,734,580 | 5/1973 | Piscitelli ............................. 384/273 |
| 3,776,611 | 12/1973 | Jentsch ............................... 384/152 |
| 4,206,930 | 6/1980 | Thrane . |

Primary Examiner—Lenard A. Footland
Attorney, Agent, or Firm—Schroeder & Siegfried

[57] ABSTRACT

A bearing assembly comprised of a split-ring annular bearing member having overlapping free ends and being molded of self-lubricating plastic material having a pressure velocity value at least equal to 1800 at 100 feet per minute surface speed and an annular continuous elastomeric combined sealing member and spring mounted in supporting relation to the split-ring bearing member and formed of a flowable rubber-like material, the combined sealing and spring member being mounted within a groove behind the bearing member so as to continually apply light pressure thereto to urge the same against the bearing surface so as to maintain a seal thereat; the combined sealing and spring member being of right-angled polyganol cross-sectional configuration and have concaved sides and convex corner lobes and being more narrow than the groove and sufficiently forgiving to avoid undue pressure and consequent wear upon the bearing member over the full range of temperature variations, created by high speed relative movement between parts over prolonged periods, the minimum radial dimension thereof being 60%–75% of its maximum radial dimension, the concavity of the sides being 17%–33% of its maximum radial dimension and the convexity of the corner lobes being 14%–16% of its maximum radial dimension.

35 Claims, 3 Drawing Sheets

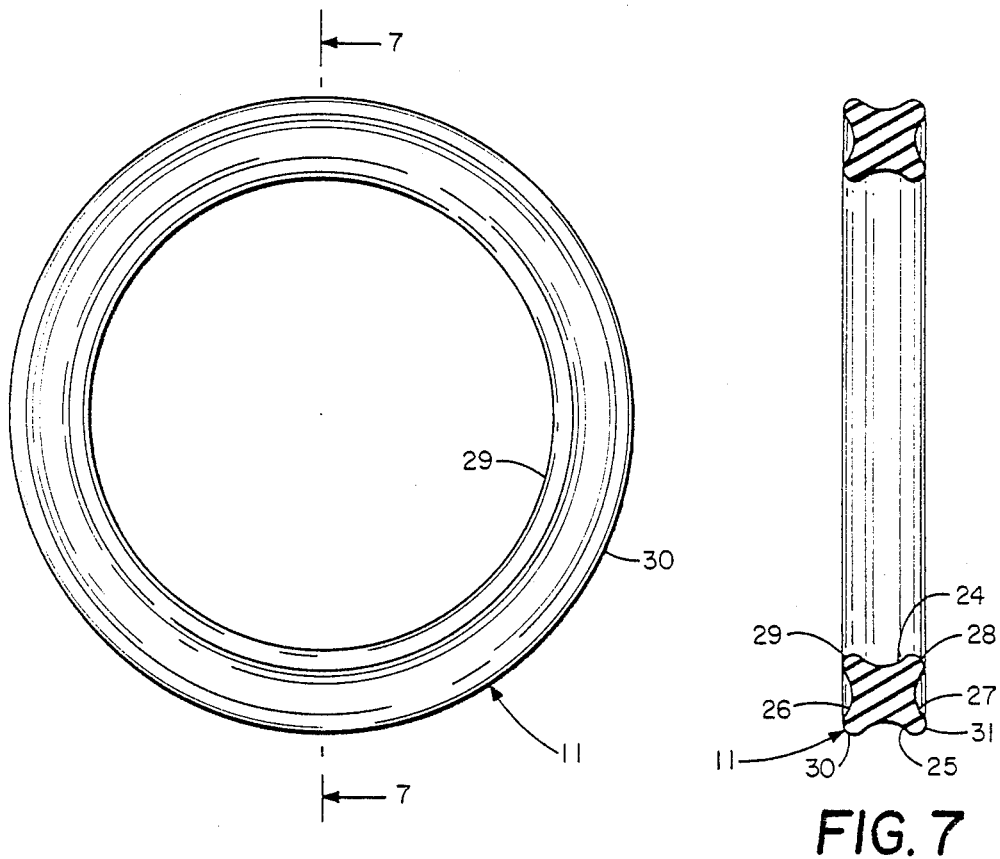
FIG. 6
FIG. 7
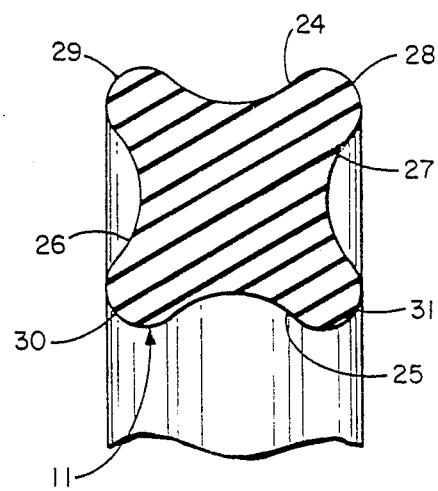
FIG. 8

MOLDED SELF-LUBRICATING SPLIT-RING BEARING ASSEMBLY

DESCRIPTION

BACKGROUND OF THE PRIOR ART

High speed relative movement between metal parts over prolonged periods create serious lubrication problems for the reason that bearings for rapidly rotating parts, for example, are produced from metals which have widely different coefficients of thermal expansion as compared to the rotating part. Obviously, high speed rotation requires good lubrication within the bearing. Moreover, even with good lubrication, high speed rotation generates heat, and as a direct consequence, the metal of the rotating part expands at a much different rate from that at which the bearing expands. Such different rates of expansion change the spacing between the sealing surfaces of the bearing and the rotating part and, as a result, the lubricant escapes therebetween. Experience has shown that the entire supply of lubricant may escape within 1-2 hours of high speed rotation under such circumstances and that thereafter, the part continues to rotate under substantially dry conditions, with severe mechanical damage resulting.

An example of the above problem can be found in the operation of cotton picking machines. Such machines may each have as many as 1920 steel spindles rotating at very high speeds for many hours at a time, while operating the picking devices at their lower ends. Each spindle is mounted within a brass bearing and its upper end is encased within a gear casing which holds the lubricant for the spindle and encases the gears which drive the spindle. It is not uncommon for such spindles to be operating under essentially dry conditions after 1½ hours of operation, all the lubricant from the casing having escaped through the abnormal spacing created by the different rates of expansions of the spindles and the bearings. This causes extensive down-time of extremely expensive machines, as well as expensive replacement of damaged parts and lubricant supply. In addition, substantial environmental damage is incurred as a result of such heavy losses of lubricant.

From the above, it can be seen that there is a crucial need for an effective seal between such relatively moving parts, one which will operate efficiently over the entire range of temperatures experienced by such rapidly rotating parts and will effectively seal over extended periods and varying circumstances. I have developed such a seal which can be incorporated into existing machines as well as to be utilized by original equipment manufacturers in their manufacture of machines having use for such seals.

It has been known for several years that certain plastics have inherent self-lubricating qualities. Consequently, it has also been known that it is advantageous under certain circumstances to utilize bearings made of such materials. Such bearings have heretofore been machined out of blocks of such material and consequently are quite expensive apart from the fact that such raw materials are also frequently expensive, especially those having the best self-lubricating qualities. In view thereof, their use has been relatively limited. Even such bearings, however, suffer relatively short lives when they are subjected to undue pressures and since the pressures produced as a result of widely varying temperatures likewise vary widely, such bearings are not well qualified for the extreme and widely varying circumstances under consideration herein. They too, wear quickly when subjected to undue pressure and it is difficult, if not impossible, to avoid such undue pressure over such a wide variety of conditions, unless provision is made to alleviate such circumstances. Thus, there is a need for a less expensive bearing which is designed so as to function adequately without excessive wear, under high speed and extended periods over a wide range of operating conditions and manufacturing tolerances. I have conceived of such an assembly.

BRIEF SUMMARY OF THE INVENTION

I have discovered a way of producing a bearing seal which overcomes the problems outlined hereinabove. My invention includes the manufacture, preferably by molding, of a bearing sealing member which is relatively thin and of split-ring construction with overlapping free ends, of a plastic material having inherent self-lubricating qualities with a pressure velocity value of at least 1800 at 100 feet per minute surface speed. This means that a bearing member made of such material will function adequately as a bearing under such conditions. Such a pressure velocity value ensures adequate self-lubricating qualities when utilized as disclosed herein. Pressure velocity value is determined by multiplying the area of the bearing by the pressure applied thereto in p.s.i. and by surface speed, expressed in feet per minute.

I incorporate this bearing sealing member within a groove which I form in one of the relatively moving surfaces so that one of the diametral surfaces thereof engages the opposite surface in sealing relation, that sealing surface of the bearing sealing member being substantially equal to the circumference of the surface against which it is to seal.

I then incorporate an annular continuous elastomeric seal and spring within the groove and behind the bearing-seal so as to bring slight pressure to bear thereagainst and to hold the sealing surface of the bearing surface in yielding relation against the opposite surface, to perfect a seal thereagainst. This elastomeric seal and spring is formed of a readily flowable material, such as rubber, and is uniform in cross-section, preferably symmetrical. I utilize a ring which is generally right-angled polygonal in cross-sectional configuration and which has its sides concaved and its corners in the form of convex lobes. It must be more narrow than the groove.

It is imperative that the elastomeric seal and spring be yielding and forgiving, else undue pressure will cause undue wear of the bearing-seal. I have found, for example, that the conventional O-Ring and QUAD-Ring sealing rings will not function satisfactorily over the range of tolerances involved. Instead, I find that if the ring has a pair of radially opposed working surfaces which are concaved and have minimum radial dimensions therebetween which are within the range of 60%-75% of the maximum radial dimensions between said surfaces, the bearing seal will function properly across the entire range of dimensional variations of the parts between which the seal is needed. Also, if the concavities of said surfaces are approximately 17%-33% of said maximum radial dimensions and the convexity of the lobes are preferably 14%-16% of said maximum radial dimensions, the above relative dimensions will result and provide an adequate seal.

A ring having these dimensions will adequately support such a bearing-seal under all of its operating conditions, in that it will cause the circumference thereof to adjust in accordance with the variations in circumference of the opposed surfaces between which the seal is perfected. The ring will yield as needed to accommodate the required changes in dimensions. The ends of the bearing seal will move both circumferentially and axially relative to each other to accommodate such changes in circumference. A ring having such dimensions is sufficiently yielding and forgiving so that the material from which it is made will flow into its concavities without undue pressure being applied to the bearing-seal and as a consequence, the bearing-seal will not wear unduly. I have found that such a combination is highly successful, particularly where the circumstances require lubrication for high speed relative movements over extended periods of time.

BRIEF DESCRIPTION OF THE DRAWINGS

A detailed description of one preferred embodiment of the MOLDED SELF-LUBRICATING SPLIT-RING BEARING ASSEMBLY is hereafter described with specific reference being made to the drawings, in which:

FIG. 6 is a side elevational view of an elastomeric combined seal and spring such as is shown in FIGS. 1-2 behind the bearing-seal;

FIG. 7 is a vertical sectional view taken along line 7—7 of FIG. 6;

FIG. 8 is an enlarged vertical sectional view of the ring shown in FIGS. 6-7.

DETAILED DESCRIPTION OF THE INVENTION

Figure 1:
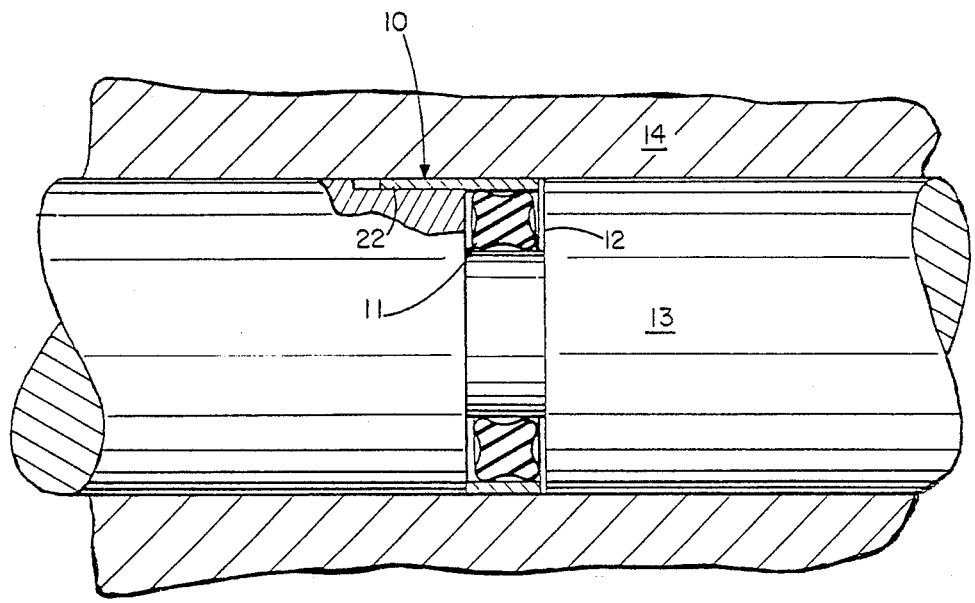
FIG. 1 is a fragmentary vertical sectional view of a brass bearing with a rapidly rotating steel shaft mounted therein and shown in elevation, with one of my new bearing-seal assemblies perfecting a seal therebetween at its outer diameter.
Figure 2:
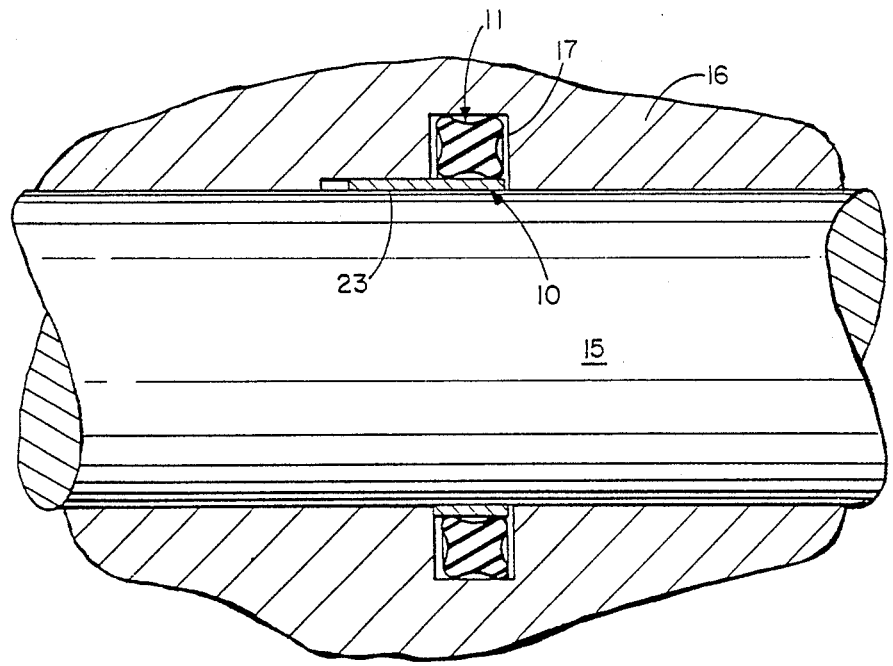
FIG. 2 is a similar fragmentary vertical sectional view of a brass bearing with a rapidly rotating steel shaft mounted therein and shown in elevation, with one of my new bearing-seal assemblies perfecting a seal therebetween at its inner diameter.

FIGS. 1-2 illustrates the use of my new bearing assembly. As shown, it includes a bearing-seal member 10 which is thin and of the split-ring type, having ends which overlap. This bearing-seal member is made of a plastic material which is either thermosetting or thermoplastic and is self-lubricating, having a pressure velocity value at least equal to 1800 at 100 feet per minute surface speed. It also includes an elastomeric combined seal and spring 11 which is made of flowable resilient material, such as rubber, and is sufficiently yieldable and forgiving so as to avoid undue pressure being applied to the backside of the bearing member 10. Such a bearing-seal assembly will wear well over long periods of time and under unusually severe circumstances, such as where the relatively moving parts move at high speeds over prolonged periods. When mounted within a groove, as shown in FIGS. 1-2, the bearing member will adjust to dimensional changes in the moving parts, which reflect the changes in temperature caused by the high speed movement. Such a combination perfects a seal at the sealing surface and at the bottom of the groove so as to prevent the loss of lubricant between the moving parts, which will normally result from the differences in co-efficient of expansion of the different materials from which the two parts are made.

FIG. 1 shows such an installation as described hereinabove within a groove 12 which is formed in the outer circumference of a steel shaft 13, which is rotating at very high speeds within a brass bearing 14, the latter providing a housing for the shaft. It will be seen that the outer circumference of the bearing-seal 10 bears against and seals against the sealing surface of the bearing 14 and the elastomeric combined seal and spring 11 exerts a slight pressure outwardly against the backside thereof. The seal 11 also seals against the bottom of the groove so as to prevent the escape of lubrication around the assembly.

FIG. 2 shows a similar rapidly rotating steel shaft 15 mounted within a brass bearing 16. In this instance, however, the groove 17 is formed in the bearing 16 rather than in the exterior surface of the shaft 15. As a consequence, the bearing-seal 10 bears against the exterior surface of the shaft 15 and the elastomeric seal and spring 11 is disposed therebehind within the groove 17 and urges the bearing-seal 10 into sealing relation with the outer circumference of the shaft 15. It will be noted that in this instance, the seal is perfected at the inner diameter of the bearing seal 10, whereas in FIG. 1, the seal is perfected at the outer diameter thereof.

Figure 3:
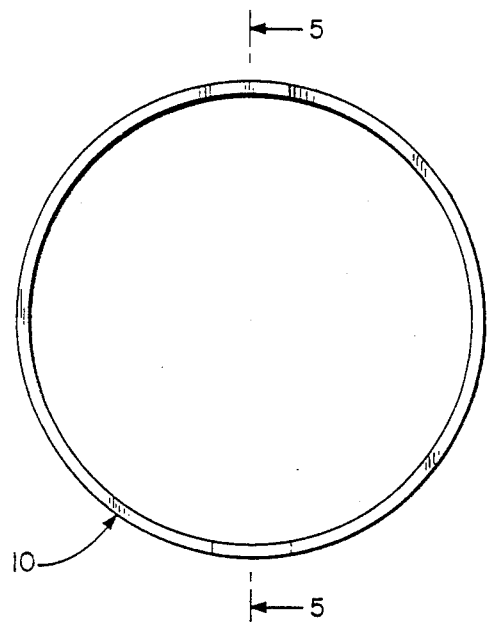
FIG. 3 is a side elevational view of one of my bearing-seals.
Figure 5:
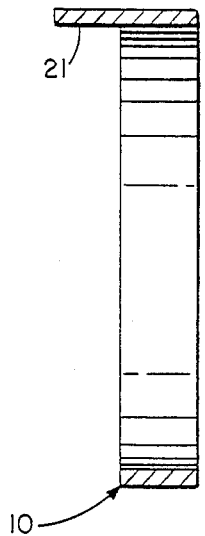
FIG. 5 is a vertical sectional view, taken along line 5—5 of FIG. 3.
Figure 4:
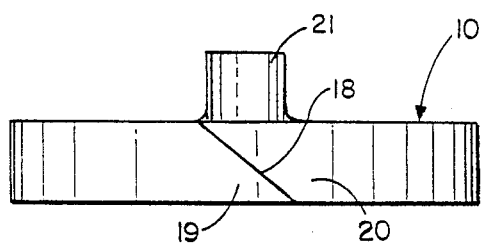
FIG. 4 is a top plan view of the bearing-seal shown in FIG. 3.

FIGS. 3-5 show the details of the bearing-seal 10. This bearing-seal 10 is preferably molded from a moldable thermoplastic or thermosetting plastic having the inherent self-lubricating qualities described hereinabove as a result of its pressure velocity value of at least equal to 1800 at 100 feet per minute surface speed. As best shown in FIG. 5, it is generally rectangular in cross-section and is relatively thin. It is annular in shape and is cut diagonally as at 18 in FIG. 4 to provide end portions 19 and 20 which are capable of moving circumferentially and axially relative to each other.

The bearing-seal 10 is symmetrical throughout its length in cross section except for the small tang 21 which extends axially outwardly therefrom and fits into either of the openings 22 in FIG. 1, or 23 in FIG. 2. These openings are formed in the shaft and bearing, respectively, for the express purpose of receiving the tang therein, whereby the bearing-seal 10 in FIG. 1 must rotate with the shaft 13 relative to the bearing 14, whereas in FIG. 2, the bearing-seal member 10 is prevented from rotating with the shaft 15. It will be noted that the tang 21 is slightly axially narrower than the opening in which it is received. The bearing-seal 10 likewise is slightly narrower than the groove in which it is positioned.

FIGS. 6-8 show the details of the elastomeric combined seal and spring 11. This element 11 is annular in shape, as shown in FIG. 6 and is generally square in cross-sectional configuration, as shown in FIGS. 7 and 8. It is comprised of a flowable resilient material, such as rubber, is symmetrical throughout its length in cross-section, and is characterized by a pair of radially spaced working surfaces 24 and 25 and a pair of opposed axially spaced surfaces 26 and 27. Each of these surfaces 24–27, inclusive, is concave and each merges substantially tangentially with adjacent convex corner lobes, such as indicated by the numerals 28–31, inclusive.

The elastomeric combined seal and spring 11, as best shown in FIG. 8, has minimum radial dimensions (measured at the bottom of the concavities 24–25), which are within the approximate range of 17%–33% of the maximum radial dimensions of the ring 11. These maximum radial dimensions will be found at the innermost and outermost point on the convex corner lobes, such as 28 and 31. The preferred range of the minimum radial dimensions of this ring is 24%–30% and the preferred single value of such minimum radial dimensions is 28% of the maximum radial dimension. The convex corner lobes 28–31, inclusive, each have a convexity of 14%–16% of the maximum radial dimension of the ring. The preferred single convexity is 16% of that maximum radial dimension.

The range of the minimum radial dimension of the ring 11 is 60%–75% of the maximum radial dimension thereof. The preferred range is 60%–70% and the preferred single value is 68% of the maximum radial dimension. I have found that an elastomeric combined seal and spring 11 when utilized as described herein in combination with such a bearing-seal, provides the necessary forgiveness or yielding function, which ensures that the bearing-seal 10 will always be urged gently against the surface to be sealed, will not fill the groove to over-flowing, and will preclude undue pressure being applied to the bearing seal 10 under extreme circumstances caused by high-speed rotation or other movement over prolonged periods.

Figure 9:
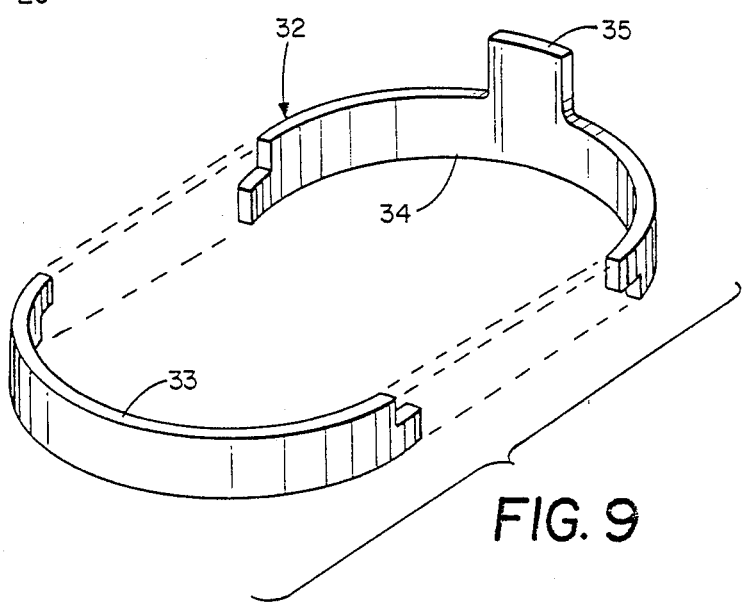
FIG. 9 is a perspective view of a molded sectional bearing-seal member where the two sections are substantially identical.

FIG. 9 shows a sectional annular bearing-seal 32 which is comprised of pair of substantially identically constructed sections 33 and 34, the only difference being the presence of the tang 35 on section 34. It will be seen that the ends of each of the sections 33 and 34 are stepped so as to overlap and form an annular ring when positioned within a groove, such as is shown in FIGS. 1 and 2. Such a bearing-seal can be molded relatively inexpensively and should function substantially as well as those shown in FIGS. 1 and 2, when they are backed up with an elastomeric combined seal and spring, such as element 11 described hereinabove. When so mounted, the two sections 33 and 34 will define the split-ring bearing and seal and will adjust by extension or contraction in response to dimensional variations in the moving parts, such as the shaft 13 and bearing 14.

As shown in FIGS. 1 and 2, my new bearing assembly can be utilized so as to perfect a seal at either the internal diameter of the bearing-seal or at its outer diameter. In either case, the combined seal and spring bears against the bearing-seal and urges it gently against the opposed sealing surface to perfect a seal therebetween. Pressures within the range of 1.9–3.0 p.s.i. per linear inch of seal are created and applied to the bearing-seal in this manner, the amount of pressure created being dependent upon the inherent variations in the groove area created by manufacturing tolerances stack-up. The latter is the sum of the variations in the bores, in the groove width and depth, and in the tolerances of the ring itself. A groove will vary 0.006 inch in depth and 0.003 inch in width. The ring itself will vary 0.006 inch in dimensions. The combined seal and spring must be compressed 0.010 inch when installed, in order to provide adequate pressure behind the bearing-seal and yet not overfill the groove.

As the steel shaft rotates at high speed and over prolonged periods, substantial heat is generated. This heat creates dimensional changes in both the steel shaft and the brass bearing or housing. Without my bearing-seal, the lubricant will escape between the shaft and brass housing. My bearing-seal, however, adjusts in response to these changes in the steel shaft and brass bearing, the combined seal and spring urging the bearing-seal against the opposed surface gently but firmly and causing the bearing seal to adjust circumferentially while maintaining sealing contact against the opposed sealing surface. The dimensional features of the combined seal and spring outlined hereinabove preclude it from overflowing the groove with consequent undue pressure upon the bearing-seal.

As indicated hereinabove, the combined seal and spring completes the seal at the bottom of the groove in either installation. As such, it prevents the escape of lubricant and avoids undue wear for extended periods of operation. In so doing, it eliminates extensive downtime and avoids severe wear damage which would otherwise occur when the lubricant escapes. It also greatly avoids costly replacement of parts which result from such undue wear.

Wherever herein I have utilized the term "moldable", it is intended to include molding via injection molding and/or transfer molding.

As indicated above, the elastomeric combined seal and spring 11 can be manufactured from either thermoplastic or thermosetting plastic materials. A requirement is that the material have a pressure velocity value at least equal to 1800 at 100 feet from its surface speed. Some of the materials which qualify as having such qualities are relatively expensive, whereas others are found to be of lower commercial value. Thus, for the circumstances where the wearing qualities are less demanding unmodified polycarbonates or unmodified polystyrene, which are both thermoplastics, may be utilized because they are relatively inexpensive. The temperatures which are reached as a result of the high speed movement has a strong bearing upon the decision of the plastic to be selected.

The split-ring feature of the bearing is such because it permits the bearing to contour to the shape and dimensions of the shaft. In other words, it provides for thermoexpansion of the parts between which the seal is to be perfected. It is imperative, however, that the spring not be too strong, else the bearing-seal will be urged against the sealing surface with undue pressure, resulting in undue wear of the material from which the bearing-seal is molded. Over-filling of the groove, for example, will create such undue pressure and consequent excessive wear.

For cost effectiveness, probably a 6–10 Nylon with modifiers would be most desirable in the long run. Nylons, however, are relatively expensive in that they sell at the $3–$4 per pound range. Other plastic, such as polyethylene, polypropylene, styrene and polyvinylchloride, all thermoplastics, are sold in the neighborhood of $1 per pound, and since they are readily moldable, can be utilized in a large variety of circumstances, at a substantial saving in cost, particularly in view of the fact that they are moldable and, thus the cost of machining of the more expensive plastics is avoided.

In considering this invention, it should be remembered that the present disclosure is illustrative only and the scope of the invention should be determined by the appended claims.

What is claimed is:

1. A self-adjusting, self-lubricating bearing assembly comprising:
   (a) a shaft member constructed and arranged to be rotated at high speed about its longitudinal axis;
   (b) a housing member surrounding said shaft and constructed and arranged to contain lubricating fluid in surrounding and lubricating relation to said shaft member as it rotates;
   (c) said housing member and said shaft member being constructed and arranged to cooperatively define an annular groove therebetween;
   (d) a molded, non-continuous, split-ring self-lubricating annular bearing formed of moldable self-lubricating material having a pressure velocity value at least equal to 1800 at 100 feet per minute surface speed;
   (e) said bearing being disposed within said annular groove and have axial dimensions substantially equal to the axial dimensions of said groove and extending in encircling relation to said shaft member and having a portion thereof engaging one of said members in sealing relation;
   (f) said bearing being of uniform cross-sectional configuration throughout substantially its entire circumference;
   (g) a sealing ring made of a uniform resilient, flowable rubber-like material mounted within said groove axially opposite said portion of said bearing which engages one of said members in sealing relation and bearing thereagainst and cooperatively perfecting therewith a seal between said shaft member and said housing member;
   (h) the axial dimensions of said sealing ring in its free form being less than the axial dimensions of said groove; and
   (i) the combined radial dimensions of the portion of said bearing which engages one of said members in sealing relation and of said sealing ring in its free form slightly exceeding the radial dimensions of said groove, whereby said sealing ring and said latter portion are maintained under slight radial compression within said groove, and a seal between said housing member and said shaft member is thereby perfected and maintained.

2. A self-adjusting, self-lubricating bearing assembly comprising:
   (a) a molded split-ring type annular bearing member composed of readily moldable plastic material having inherent self-lubricating qualities with a pressure-velocity value of no less than 1800 at 100 feet per minute surface speed;
   (b) said bearing member being non-continuous and constructed and arranged for having its internal circumference increased and decreased and having adjacent opposite end portions movable circumferentially thereof as its internal circumference varies;
   (c) support structure mounted in supporting relation to said bearing member and having a sealing surface opposite same and having an annular sealing groove formed therein opposite said surface and in the same radial plane as said bearing member;
   (d) a continuous annular sealing member mounted under slight radial compression within said groove in supporting relation to said bearing member;
   (e) said sealing member being formed of uniformly resilient, flowable rubber-like material throughout and being of generally uniform right-angled polygonal cross-sectional configuration throughout;
   (f) the combined radial dimensions of said bearing and said sealing member in its free form being slightly in excess of the depth of said groove whereby said sealing member maintains said bearing member under slight compression at all times; and
   (g) said sealing member having maximum axial dimensions slightly less than the axial dimensions of said groove.

3. The structure defined in claim 2 wherein said bearing member has free end portions movable circumferentially relative to each other to compensate for thermal expansion and contraction of a workplace while journaling the latter.

4. The structure defined in claim 2 wherein said bearing member has free end portions movable circumferentially past each other and has a circumferentially expandable and contractable bearing surface constructed and arranged to compensate for thermal expansion and contraction of a workpiece when the latter is supported thereby for relative movement therebetween.

5. The structure defined in claim 2 wherein said sealing member is in encircling and constricting relation to said bearing member.

6. The structure defined in claim 2 wherein said bearing member has free end portions movable both circumferentially and axially relative to each other to compensate for thermal expansion and contraction of a workpiece when the latter is supported thereby for relative movement therebetween.

7. The structure defined in claim 2 wherein said bearing member is in encircling relation to said sealing member and the latter urges said bearing member outwardly against said sealing surface.

8. The structure defined in claim 2 wherein said bearing member is comprised of two separate, arcuately shaped, molded pieces.

9. The structure defined in claim 2 wherein said bearing member is formed primarily of a material selected from a group of readily moldable thermoplastic and thermosetting materials.

10. The structure defined in claim 2 wherein said bearing member is formed primarily from a readily moldable thermoplastic material.

11. The structure defined in claim 2 wherein said bearing member is formed primarily from a readily moldable thermosetting material.

12. The structure defined in claim 2 wherein said sealing member is square in its general cross-sectional configuration and dimensions and has concave sides and convexly-shaped corner portions merging substantially tangentially with said concave sides in a continuous arc.

13. The structure defined in claim 2 wherein said sealing member has a pair of spaced peripheral working surfaces each of which, in its free form has a radius of concavity approximating 24%–30% of the maximum radial dimension between said surfaces.

14. The structure defined in claim 2 wherein said sealing member has a pair of spaced peripheral working surfaces which in their free form have a minimum radial dimension therebetween approximating 60%–70% of the maximum radial dimension between said surfaces.

15. The structure defined in claim 2 wherein said sealing member has a pair of radially spaced peripheral working surfaces each of which in its free form has a radius of concavity approximating 24%–30% of the maximum radial dimension between said two surfaces and is spaced from the other a minimum radial dimension of approximately 60%–70% of the maximum radial dimension between said surfaces.

16. The structure defined in claim 2 wherein said sealing member has a pair of radially spaced working surfaces each of which in its free form has a radius of concavity approximating 28% of the maximum radial dimension between said pair of surfaces.

17. The structure defined in claim 2 wherein said sealing member has a pair of radially spaced working surfaces having in their free form a minimum radial distance therebetween approximating 68% of the maximum radial distance therebetween.

18. The structure defined in claim 2 wherein said sealing member encircles said bearing member and in its free form has an internal diameter which is slightly less than the outer circumference of said bearing member at the point at which said sealing member supports said bearing member.

19. A self-adjusting, self-lubricating bearing assembly comprising:
  (a) a molded split-ring type annular bearing member composed of readily moldable plastic material having inherent self-lubricating qualities with a pressure velocity value of no less than 1800 at 100 feet per minute surface speed;
  (b) said bearing member being non-continuous and constructed and arranged for having its internal circumference increased and decreased and having adjacent opposite end portions movable circumferentially of said member as its internal circumference varies;
  (c) support structure mounted in supporting relation to said bearing member and having a sealing surface opposite same and having an annular sealing groove formed therein opposite said sealing surface and in the same radial plane as said bearing member;
  (d) said bearing member being disposed within said groove in sealing relation with said surface;
  (e) a continuous annular sealing member mounted under slight radial compression within said groove in encircling and constricting relation to said bearing member;
  (f) said sealing member being formed of uniformly resilient, flowable rubber-like material throughout and being of generally uniform right-angled polygonal cross-sectional configuration throughout;
  (g) the combined radial dimensions of said bearing and said sealing member in its free form being slightly in excess of the depth of said groove whereby said sealing member maintains said bearing member under slight compression and constriction and in sealing relation against said sealing surface at all times; and
  (h) said sealing member having maximum axial dimensions slightly less than the axial dimensions of said groove.

20. A self-adjusting, self-lubricating bearing assembly comprising:
  (a) a molded split-ring type annular bearing member composed of readily moldable plastic material having inherent self-lubricating qualities with a pressure-velocity value of no less than 1800 at 100 feet per minute surface speed;
  (b) said bearing member being non-continuous and constructed and arranged for having its circumference increased and decreased and having adjacent opposite end portions movable circumferentially of said member as its circumference varies;
  (c) support structure mounted in supporting relation to said bearing member and having a sealing surface opposite same and having an annular sealing groove formed therein opposite said sealing surface and in the same radial plane as said bearing member;
  (d) said bearing member being mounted within said groove in sealing relation with said sealing surface;
  (e) a continuous annular sealing member mounted under slight radial compression within said groove and within said bearing member in expanding relation to said bearing member;
  (f) said sealing member being formed of uniformly resilient, flowable rubber-like material throughout and being of generally uniform right-angled polygonal cross-sectional configuration throughout;
  (g) the combined radial dimensions of said bearing member and said sealing member in its free form being slightly in excess of the depth of said groove whereby said sealing member maintains said bearing member under slight compression and in sealing relation against said sealing surface at all times; and
  (h) said sealing member having maximum axial dimensions slightly less than the axial dimensions of said groove.

21. The structure defined in claim 20 wherein said sealing member is encircled by said bearing member and constantly gently urges same toward a larger bearing circumference.

22. The structure defined in claim 20 wherein said sealing member is comprised of an elastomeric sealing ring which has a generally polygonal cross-sectional configuration and a pair of radially spaced concaved working surfaces which in their free form are spaced at their closest proximity a distance approximating 60%–70% of the maximum radial dimension between said surfaces.

23. The structure defined in claim 20, wherein said sealing member is comprised of an elastomeric sealing ring expanding said bearing member, said ring having a pair of radially spaced concave working surfaces, the radius of concavity of said surfaces in their free form being 24%–30% of the maximum radial dimension between said two surfaces.

24. The structure defined in claim 20 wherein said sealing member is comprised of an elastomeric sealing ring bearing against the inner diametral surface of said bearing member, said ring having a pair of radially spaced concave working surfaces, the radius of concavity of each of said surfaces in its free form approximating 28% of the maximum radial dimension between said pair of surfaces.

25. The structure defined in claim 20, wherein said sealing member is comprised of an elastomeric sealing ring bearing against the inner diametral surface of said bearing member, said ring having a pair of radially spaced concave working surfaces, said surfaces in their free form having a minimum radial distance therebetween approximating 68% of the maximum radial distance therebetween.

26. The structure defined in claim 20 wherein said sealing member is comprised of an elastomeric sealing ring bearing against the inner diametral surface of said bearing means, said ring having a pair of radially spaced working surfaces which in their free form have a radius of concavity approximating 24%-30% of the maximum radial dimension between said two surfaces and having a minimum radial dimension there-between of approximately 60%-70% of the maximum radial dimension between said working surfaces.

27. A self-adjusting, self-lubricating bearing assembly for a journal comprising:
(a) a molded split-ring type annular bearing member composed of readily moldable plastic material having inherent self-lubricating qualities with a pressure velocity value greater than 1800 at 100 feet per minute surface speed;
(b) said bearing member being non-continuous and constructed and arranged to receive a journal therewithin and for having its internal circumference increased and decreased in accordance with thermal expansion and contraction of the journal and toward that end having adjacent opposite end portions movable circumferentially of said member as its internal circumference varies; and
(c) elastic constrictor means applied to said bearing member and constantly urging the same toward a smaller circumference whereby its circumference will increase and decrease as the circumference of its journal increases and decreases, respectively, in accordance with the thermal expansion and contraction of the journal.

28. The structure defined in claim 27, wherein said elastic constrictor means is comprised of an elastomeric sealing ring.

29. The structure defined in claim 27 wherein said elastic constrictor means is comprised of an elastomeric sealing ring which has a polygonal cross-section configuration with concaved side surfaces.

30. The structure defined in claim 27 wherein said elastic constrictor means encircles said bearing means and is comprised of a sealing ring which in its free form has an internal diameter which is slightly less than the circumference of said bearing member at the point at which said sealing ring encircles said bearing member.

31. The structure defined in claim 27 wherein said bearing is comprised of two separate arcuately-shaped bearing elements substantially identical in configuration and construction.

32. The structure claimed in claim 27 wherein said bearing member has free end portions movable circumferentially relative to each other to compensate for thermal expansion and contraction of its journal.

33. The structure claimed in claim 27 wherein said bearing member has free end portions movable circumferentially past each other and has a circumferentially expandable and contractable internal bearing surface constructed and arranged to compensate for thermal expansion and contraction of its journal.

34. The structure defined in claim 27 wherein said bearing member has free end portions movable both circumferentially and axially relative to each other to compensate for thermal expansion and contraction of its journal.

35. The structure defined in claim 27 wherein said bearing member is comprised of two separate arcuately-shaped substantially identical molded pieces.

* * * * *

UNITED STATES PATENT AND TRADEMARK OFFICE
CERTIFICATE OF CORRECTION

PATENT NO. : 4,764,035
DATED : August 16, 1988
INVENTOR(S) : Richard M. Boyd

It is certified that error appears in the above-identified patent and that said Letters Patent is hereby corrected as shown below:

Column 8, line 14, "Workplace" should read "workpiece"

Signed and Sealed this

Seventeenth Day of January, 1989

Attest:

DONALD J. QUIGG

*Attesting Officer*  *Commissioner of Patents and Trademarks*